(12) United States Patent
Simpson et al.

(10) Patent No.: US 9,696,160 B2
(45) Date of Patent: Jul. 4, 2017

(54) ROUTE PLANNING

(71) Applicant: BAE SYSTEMS plc, London (GB)

(72) Inventors: Richard Edward Simpson, Bristol (GB); Arthur George Richards, Bristol (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/905,185

(22) PCT Filed: Jul. 7, 2014

(86) PCT No.: PCT/GB2014/052066
§ 371 (c)(1),
(2) Date: Jan. 14, 2016

(87) PCT Pub. No.: WO2015/008033
PCT Pub. Date: Jan. 22, 2015

(65) Prior Publication Data
US 2016/0161257 A1    Jun. 9, 2016

(30) Foreign Application Priority Data

Jul. 15, 2013  (EP) ..................................... 13275163
Jul. 15, 2013  (GB) .................................. 1312586.9

(51) Int. Cl.
*B60L 3/00*  (2006.01)
*G01C 23/00*  (2006.01)
(Continued)

(52) U.S. Cl.
CPC ............. *G01C 21/00* (2013.01); *G01C 21/20* (2013.01); *G05D 1/0206* (2013.01)

(58) Field of Classification Search
USPC ..................................................... 701/21, 3
See application file for complete search history.

(56) References Cited

U.S. PATENT DOCUMENTS 8,145,369 B1   3/2012  Tureaud et al.
8,150,621 B1   4/2012  Phillips et al.
(Continued)

FOREIGN PATENT DOCUMENTS

EP   1867952 A1    12/2007
WO   2011063162 A1  5/2011
WO   2015008033 A1  1/2015

OTHER PUBLICATIONS

International Preliminary Report on Patentability received for Patent Application No. PCT/GB2014/052066, mailed on Jan. 28, 2016. 6 pages.

(Continued)

*Primary Examiner* — Tyler Paige
(74) *Attorney, Agent, or Firm* — Finch & Maloney PLLC

(57) ABSTRACT

A method and apparatus for determining routes vehicles (4, 6), the method comprising: measuring positions of a first vehicle and a second vehicle (6); providing a specification of a region (12) having a fixed position in relation to the first vehicle (4); using the measurements and the region specification, determining a first route for the first vehicle (4) and a second route for the second vehicle (6). Determining the routes comprises: constructing a graph (34) within a joint state space (X) of the vehicles (4, 6); identifying, within the graph (34), a path from a first vertex to a second vertex, the first vertex corresponding to the measured positions of the vehicles (4, 6), and the second vertex corresponding to the second vehicle (6) being at least partially located within the region (12); and, using the identified path, determining the first and second routes.

20 Claims, 6 Drawing Sheets

(51) Int. Cl.
*G01C 21/00* (2006.01)
*G01C 21/20* (2006.01)
*G05D 1/02* (2006.01)

(56) References Cited

U.S. PATENT DOCUMENTS

| | | | |
|---|---|---|---|
| 2004/0042405 A1 | 3/2004 | Nesbitt | |
| 2004/0102876 A1* | 5/2004 | Doane | B64C 13/20 701/9 |
| 2005/0216181 A1 | 9/2005 | Estkowski et al. | |
| 2006/0015247 A1* | 1/2006 | Speer | G01C 21/00 701/467 |
| 2007/0179685 A1* | 8/2007 | Milam | G01C 21/00 701/3 |
| 2009/0276105 A1 | 11/2009 | Lacaze et al. | |
| 2011/0029155 A1 | 2/2011 | Ruffa | |
| 2012/0123668 A1* | 5/2012 | Spinelli | G05D 1/104 701/120 |

OTHER PUBLICATIONS

International Search Report and Written Opinion received for Patent Application No. PCT/GB2014/052066, mailed on Aug. 22, 2014. 9 pages.
GB Intellectual Property Office Search Report under Section 17(5) received for GB Patent Application No. 1312586.9 mailed Jan. 14, 2014. 3 pages.
Extended European Search Report received for EP Patent Application No. 13275163.7 mailed Jan. 8, 2014. 4 pages.
Bry, Adam and Roy, Nicholas, "Rapidly-exploring Random Belief Trees for Motion Planning Under Uncertainty," 2011 IEEE International Conference on Robotics and Automation, Shanghai International Conference Center, May 9-13, 2011. pp. 723-730.

\* cited by examiner

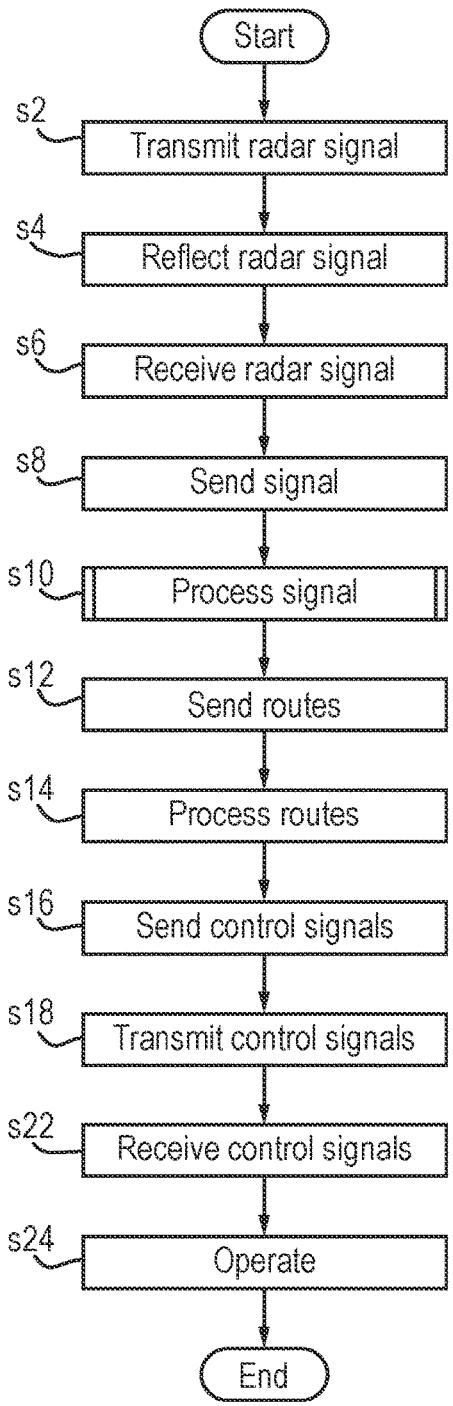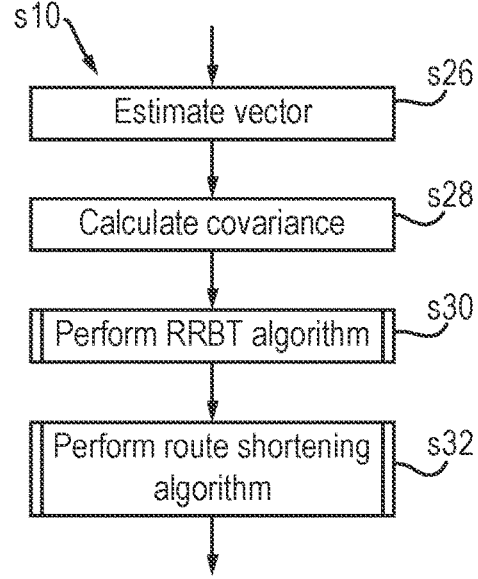

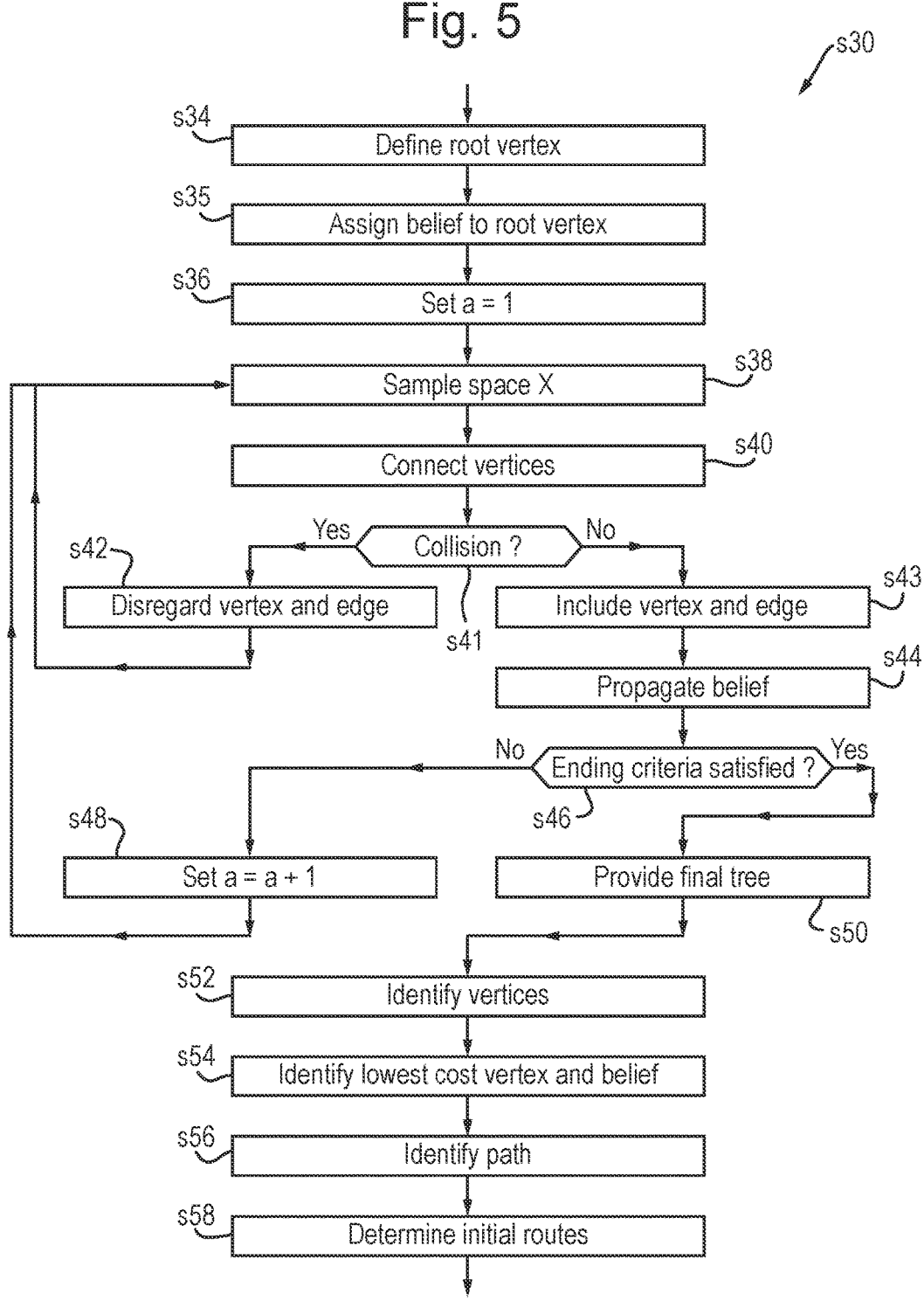

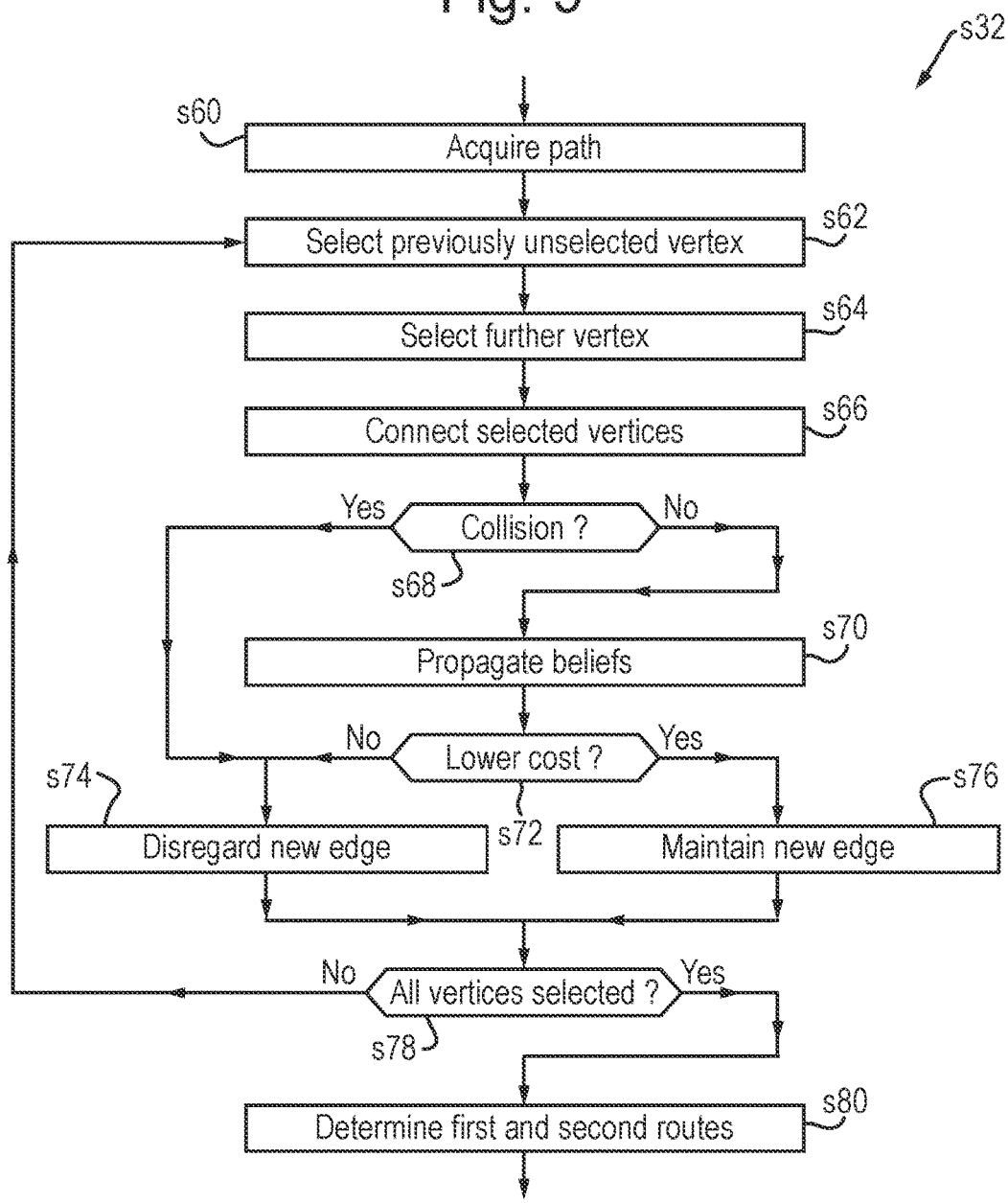

ROUTE PLANNING

FIELD OF THE INVENTION

The present invention relates to determining coordinated routes for a plurality of vehicles.

BACKGROUND

Autonomous vehicles are often used to conduct dangerous, repetitive or time consuming tasks.

Multiple interacting autonomous vehicles may be used to achieve a common goal.

During certain tasks it may be desired or necessary that two or more of the autonomous vehicles "rendezvous" i.e. move in such a way that one autonomous vehicle is located within a region that has a fixed location relative to a different autonomous vehicle. A rendezvous between two of more vehicles may be, for example, for the purpose of a transfer of fuel or cargo between the autonomous vehicles, transportation of one autonomous vehicle by another, or the undertaking of repairs.

Many conventional algorithms for determining paths or routes for vehicles tend not to be capable of determining routes that provide multi-vehicle rendezvous.

SUMMARY OF THE INVENTION

The present inventor has realised that multi-vehicle rendezvous may be provided for using a path planning process that takes into account future localisation uncertainty of the multiple vehicles. The present inventor has realised that multi-vehicle rendezvous may be provided by using belief state planners to plan routes such that localisation uncertainty of multiple vehicles is accounted for.

The present inventor has realised that, by planning routes for multi-vehicle rendezvous such that localisation uncertainty of multiple vehicles is accounted for, a likelihood of a failure of the determined routes tends to be reduced.

In a first aspect, the present invention provides a method of determining routes for at least two vehicles, the method comprising: measuring, by a measurement apparatus, a position of a first vehicle; measuring, by the measurement apparatus, a position of a second vehicle; providing, for use by one or more processors, a specification of a region, the region having a fixed position in relation to the first vehicle; using the measurements and the specification of the region, performing, by the one or more processors, a route determination process to determine a first route for the first vehicle and a second route for the second vehicle; wherein the route determination process comprises: constructing a graph within a joint state space of the vehicles, the graph comprising a plurality of vertices and one or more edges connecting those vertices; identifying, within the constructed graph, a path from a first vertex of the graph to a second vertex of the graph, the first vertex corresponding to the measured positions of the vehicles, and the second vertex corresponding to the second vehicle being at least partially located within the region; and, using the identified path, determining routes for the vehicles, thereby providing the first and second routes.

The method may further comprise controlling, by a vehicle controller operatively coupled to the one or more processors, the vehicles such that the first vehicle follows the first route and the second vehicle follows the second route, thereby providing that the second vehicle is at least partially located within the region.

The graph may be a tree.

The step of constructing the graph may comprise initialising the graph by determining, using the measured positions of the vehicles, the first vertex of the graph, and one or more times performing steps (i) to (iii), thereby providing the graph, wherein: step (i) comprises sampling the joint state space of the vehicles to provide a further vertex; step (ii) comprises providing an edge connecting the further vertex to a different vertex of the graph; and step (iii) comprises including the further vertex and the edges in the graph.

In some aspects, for each performance of steps (i) to (iii), an edge is only included in the graph if, were the first and second vehicles to follow vehicle routes defined by that edge, each vehicle would not collide with another vehicle or non-vehicle object.

The step of identifying the path from the first vertex to the second vertex may comprise: assigning, to one or more vertices within the graph, one or more belief values; propagating, along each path in the graph, the belief values so as assign to each vertex in the graph one or more belief values, each belief value associated to a vertex in the graph corresponding to a unique path in the graph that passes through that vertex; and selecting, based upon one or more of the belief values, a path from the first vertex to the second vertex.

A belief value assigned to the first vertex may be indicative of an uncertainty associated with the measurements of the positions of the vehicles.

For each vertex in the graph other than the first vertex, a belief value assigned to that vertex may be indicative of a positional uncertainty of the vehicles if the vehicles were to follow a route specified by a path in the graph from the first vertex to that vertex.

The step of propagating the belief values may comprise adjusting one or more belief values to account for further measurements of a position of one or both of the vehicles taken by the measurement apparatus.

For each vertex in the graph other than the first vertex, a belief value assigned to that vertex may be indicative of a cost value associated with the vehicles following a route specified by a path in the graph from the first vertex to that vertex.

The step of identifying the path from the first vertex to the second vertex may comprises identifying, from a set of belief values assigned to the second vertex, the belief value corresponding to the lowest cost value, and identifying the path from the first vertex to the second vertex corresponding to the identified belief value.

The step of, using the identified path, determining routes for the vehicles may comprise performing a path shortening algorithm on the identified path so as to provide a shortened path, and determining routes for the vehicles specified by the shortened path, thereby providing the first and second routes.

The path shortening algorithm may comprise: selecting a vertex along the identified path so as to provide a first path vertex; selecting a further vertex along the identified path so as to provide a second path vertex, the second path vertex being connected to the first path vertex by at least two edges; determining a first cost value, the first cost value being indicative of a cost associated with a path within the identified path from the first path vertex to the second path vertex; providing an additional edge, the additional edge having as its starting vertex the first path vertex and as its ending vertex the second path vertex; determining a second cost value, the second cost value being indicative of a cost associated with a path from the first path vertex to the second path vertex along the additional edge; and depending on the first and second cost values, either: disregarding the additional edge and maintaining the identified path; or modifying the identified path by removing, from the identified path, the edges and vertices in the identified path by which the first path vertex and the second path vertex are connected, and including, in the identified path, the additional edge.

One or more of the vehicles may be an unmanned vehicle.

The measurement apparatus may comprise one or more measurement systems selected from the group of measurement systems consisting of: a radar system, and a global positioning system.

The route determination process may comprise performing a Rapidly-exploring Random Belief Tree algorithm to determine the first route for the first vehicle and the second route for the second vehicle.

In a further aspect, the present invention provides a method of determining routes for at least two vehicles, the method comprising: measuring, by measurement apparatus, a position of a first vehicle; measuring, by the measurement apparatus, a position of a second vehicle; providing, for use by one or more processors, a specification of a region, the region having a fixed position in relation to the first vehicle; using the measurements and the specification of the region, performing, by the one or more processors, a Rapidly-exploring Random Belief Tree algorithm to determine a first route for the first vehicle and a second route for the second vehicle; wherein the first and second routes are such that, if the first vehicle were to follow the first route, and the second vehicle were to follow the second route, the second vehicle would be at least partially located within the region.

In a further aspect, the present invention provides apparatus for determining routes for at least two vehicles, the apparatus comprising: measurement apparatus configured to measure a position of a first vehicle and a position of a second vehicle; and one or more processors coupled to the measurement apparatus and configured to, using the measurements and using a specification of a region having a fixed position in relation to the first vehicle, perform a route determination process to determine a first route for the first vehicle and a second route for the second vehicle; wherein the route determination process comprises: constructing a graph within a joint state space of the vehicles, the graph comprising a plurality of vertices and one or more edges connecting those vertices; identifying, within the constructed graph, a path from a first vertex of the graph to a second vertex of the graph, the first vertex corresponding to the measured positions of the vehicles, and the second vertex corresponding to the second vehicle being at least partially located within the region; and determining routes for the vehicles specified by the identified path, thereby providing the first and second routes.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the preceding aspect.

BRIEF DESCRIPTION OF THE DRAWINGS

FIG. 3 is a process flow chart showing certain steps of an embodiment of a method of controlling vehicles;

FIG. 4 is a process flow chart showing certain steps of a route determination process;

FIG. 5 is a process flow chart showing certain steps of a Rapidly-exploring Random Belief Tree algorithm;

FIG. 9 is a process flow chart showing certain steps of a route shortening algorithm.

DETAILED DESCRIPTION

Figure 1:
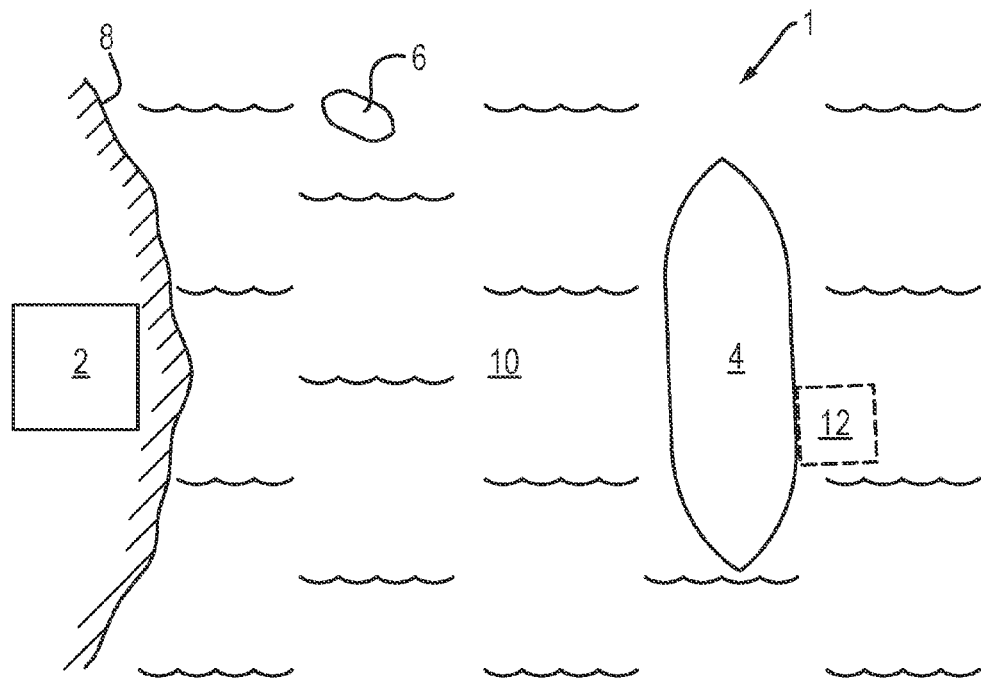
FIG. 1 is a schematic illustration (not to scale) of a scenario.

FIG. 1 is a schematic illustration (not to scale) of a scenario 1 in which an embodiment of a method of controlling a group of vehicles is to be implemented.

The scenario 1 comprises a ground station 2, a first vehicle 4, and a second vehicle 6.

In the scenario 1, the ground station 2 is located on land 8 that adjacent to a body of water 10 (e.g. a sea). The ground station is described in more detail later below with reference to FIG. 2.

In the scenario 1, the first vehicle 4 is a water-based vehicle. In particular, the first vehicle 4 is an unmanned autonomous ship which is controllable by the ground station 2 as described in more detail later below with reference to FIGS. 3 to 10. The first vehicle 4 is located at the surface of the body of water 10 at a position that is remote from the land 8.

In the scenario 1, the second vehicle 6 is a water-based vehicle. In particular, the second vehicle 6 is an unmanned autonomous boat. In this scenario 1, the second vehicle 6 is a smaller vehicle than the first vehicle 4. The second vehicle 6 is which is controllable by the ground station 2 as described in more detail later below with reference to FIGS. 3 to 10. The second vehicle 6 is located at the surface of the body of water 10 at a position that is remote from the land 8 and remote from the first vehicle 4.

In this scenario 1, initially the second vehicle 6 was carried aboard the first vehicle 4. The second vehicle was then launched from the first vehicle 4. After being launched from the first vehicle 4, the second vehicle 6 was controlled (e.g. by the ground station 2) so as to conduct a hydrographic survey within the vicinity of the first vehicle 4. In other embodiments, the vehicles 4, 6 may have been controlled so as to perform a different type of task, such as a search and rescue task, or a surveillance task.

After completion of the hydrographic survey, the second vehicle 6 is to return to being onboard the first vehicle 4. This is achieved by the first and/or second vehicles 4, 6 moving such that the second vehicle 6 is located wholly within a region, or zone, on the body of water 10. This region or zone is hereinafter referred to as the "goal zone" and is indicated in FIG. 1 by a dotted box and the reference numeral 12. Once the second vehicle is 6 is located wholly within the goal zone 12, a winch or other lifting apparatus that is located onboard the first vehicle 4 may be operated to lift the second vehicle 6 onto the first vehicle 4.

The goal zone 12 is a zone on the surface of the body of water 10 that has a fixed position relative to the first vehicle 6. The goal zone 12 is a region on the surface of the body of water 10 that is proximate to the first vehicle 4. The goal zone 12 is a region into which the second vehicle 6 is to move so that the second vehicle 6 can be winched on to the first vehicle 4.

An embodiment of a method of controlling the vehicles 4, 6 so that the second vehicle 6 is located wholly within the goal zone 12 is described in more detail later below with reference to FIG. 3.

Figure 2:
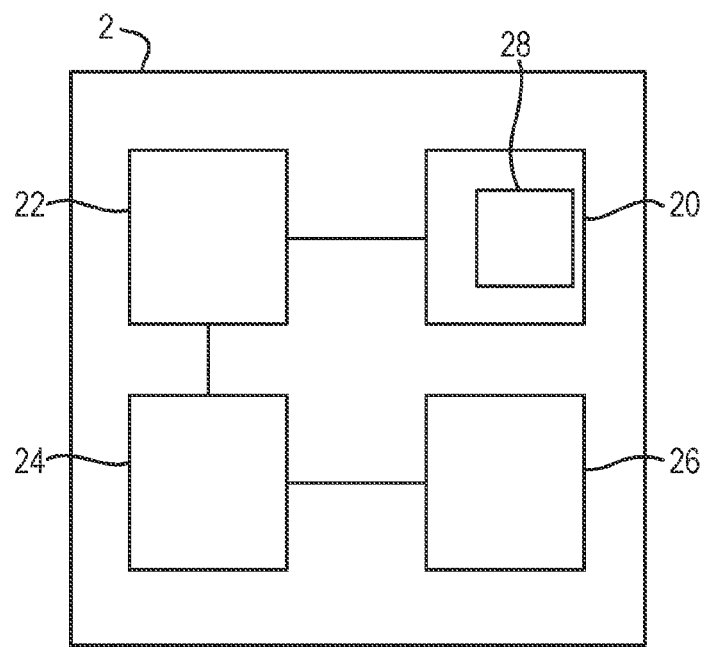
FIG. 2 is a schematic illustration (not to scale) of a ground station.

FIG. 2 is a schematic illustration (not to scale) showing the ground station 2.

In this embodiment, the ground station 2 comprises a radar system 20, a route determination module 22, a vehicle control module 24, and a transceiver 26.

In this embodiment, the radar system 20 comprises a radar antenna 28 for transmitting and receiving radar signals. The radar system 20 is configured to transmit, using the radar antenna 28, a radar signal onto the body of water 10 such that the radar signal is incident on the vehicles 4, 6. Also, the radar system 20 is configured to receive, using the radar antenna 28, a radar signal that has been reflected from the body of water 10 and the vehicles 4, 6.

The radar system 20 is connected to the route determination module 22 such that a signal may be sent between the radar system 20 and the route determination module 22.

In this embodiment, the route determination module 22 is configured to process a signal received by the route determination module 22 from the radar system 20. In this embodiment, this signal processing performed by the route determination module 22 is performed to determine a route for each of the vehicles 4, 6. The signal processing performed by the route determination module 22 is described in more detail later below with reference to FIGS. 3 to 10.

In addition to being connected to the radar system 20, the route determination module 22 is connected to the vehicle control module 24 such that a signal (e.g. a signal specifying an output of the route determination module 22, e.g. a specification of a route for a vehicle 4, 6) may be sent between the route determination module 22 and the vehicle control module 24.

In this embodiment, the vehicle control module 24 is configured to process a signal received by the vehicle control module 24 from the route determination module 22. In this embodiment, this signal processing performed by the vehicle control module 24 is performed to determine a control signal for each of the vehicles 4, 6.

In addition to being connected to the route determination module 22, the vehicle control module 24 is connected to the transceiver 26 such that a signal (e.g. an output of the vehicle control module 24 e.g. a vehicle control signal) may be sent between the vehicle control module 24 and the transceiver 26.

In this embodiment, the transceiver 26 is configured to transmit, to the vehicles 4, 6, vehicle control signals that have been received by the transceiver 26 from the vehicle control module 24. In this embodiment, the transceiver 26 transmits vehicle control signals to the vehicles 4, 6 via a wireless communication link between the transceiver 26 and each of the vehicles 4, 6.

In this embodiment, each of the vehicles 4, 6 comprises apparatus for receiving a vehicle control signal from the transceiver 26. Also, each of the vehicles 4, 6 comprises apparatus for implementing actions specified by a received vehicle control signal.

FIG. 3 is a process flow chart showing certain steps of an embodiment of a method of controlling the vehicles 4, 6 so that the second vehicle 6 is located wholly within the goal zone 12.

At step s2, the radar system 20 of the ground station 2 transmits a radar signal onto the body of water 10. The transmitted radar signal is incident on the first vehicle 4 and the second vehicle 6.

At step s4 the body of water 10, the first vehicle 4 and the second vehicle 6 reflect the incident radar signal back towards the radar system 20.

At step s6, the radar system 20 receives the reflected radar signal.

At step s8, the radar system 20 sends a signal corresponding to the received radar signal to the processing module 22.

At step s10, the processing module 22 processes the signal received from the radar system 20 to determine a route for each of the vehicle 4, 6.

The route determined for the first vehicle 4 is hereinafter referred to as "the first route".

The route determined for the second vehicle 6 is hereinafter referred to as "the second route".

In this embodiment, the first and second routes are such that, if the first vehicle 4 followed the first route and the second vehicle 6 followed the second route, the second vehicle 6 would be wholly located within the goal zone 12 (which has a fixed position relative to the first vehicle 4).

The route determination process that is performed by the processing module 22 at step s10 is described in more detail later below with reference to FIG. 4.

At step s12, the processing module 22 sends a signal specifying the determined first and second routes the vehicle control module 24.

At step s14, the vehicle control module 24 processes the signal received from the processing module 22 to determine a respective vehicle control signal for each of the vehicles 4, 6.

The vehicle control signal determined for the first vehicle 4 is hereinafter referred to as "the first vehicle control signal".

The vehicle control signal determined for the second vehicle 6 is hereinafter referred to as "the second vehicle control signal".

In this embodiment, the first vehicle control signal is for controlling the first vehicle 4 such that the first vehicle 4 follows the first route. For example, the first vehicle control signal specifies instructions that, if implemented by the first vehicle 4, cause the first vehicle 4 to follow the first route.

Similarly, the second vehicle control signal is for controlling the second vehicle 6 such that the second vehicle 6 follows the second route. For example, the second vehicle 6 specifies instructions that, if implemented by the second vehicle 6, cause the second vehicle 6 to follow the second route.

At step s16, the vehicle control module 24 sends the first and second control signals to the transceiver 26.

At step s18, the transceiver 26 transmits the vehicle control signals to the relevant vehicles 4, 6.

In this embodiment, the transceiver 26 transmits the first control signal to the first vehicle 4, for example, via a first wireless communications link. Similarly, the transceiver 26 transmits the second control signal to the second vehicle 6, for example, via a second wireless communications link.

At step s22, the vehicles 4, 6 receive the vehicle control signals sent to them by the transceiver 26.

At step s24, each of the vehicles 4, 6 operate in accordance with the vehicle control signal received by that vehicle.

In other words, in this embodiment, the first vehicle 4 operates in accordance with the first control signal and is caused to follow the first route. Similarly, the second vehicle 6 operates in accordance with the second control signal and is caused to follow the second route.

After the first vehicle 4 has followed the first route and the second vehicle 6 has followed the second route, the second vehicle 6 is located wholly within the goal zone 12. Thus, the second vehicle 6 may be winched on to the first vehicle 4 using winching apparatus located on the first vehicle 4.

Thus, an embodiment of a method of controlling the vehicles 4, 6 so that the second vehicle 6 is located wholly within the goal zone 12 is provided.

Returning now to step s10 of the process of FIG. 3, FIG. 4 is a process flow chart showing certain steps of the route determination process performed by the processing module 22 to determine the first and second routes for the first and second vehicles 4, 6 respectively.

In this embodiment, the route determination process is performed to find, for each of the vehicle 4, 6, a lowest cost route that, when those routes are followed by the vehicles 4, 6, cause the second vehicle 6 to be located wholly within the goal zone 12. A "cost" of a route may be in terms of any appropriate parameter, for example, a length of that route (i.e. the distance that is to be traveled by a vehicle travelling that route), a time taken by a vehicle to travel that route, an amount of fuel used by a vehicle to travel that route, or any combination or function of those parameters.

In this embodiment, the processing module 22 comprises a linear Kalman filter. As described in more detail later below, the processing module implements 22 the Kalman filter to estimate a joint state of the vehicles 4, 6. This estimation of the joint state of the vehicles 4, 6 uses a series of measurements of the vehicles 4, 6 taken by the radar system 20 over a period of time at steps s2 to s6. These radar measurements tend to include noise and other inaccuracies.

In other embodiments, the processing module 22 comprises a non-linear filter, such as an Extended Kalman Filter (EKF) or an Unscented Kalman Filter (UKF), instead of or in addition to the linear Kalman filter.

At step s26, using the signal corresponding to the received radar signal received by the processing module 22, the processing module 22 produces an estimate of an initial joint state vector. The initial joint state vector is an initial state of the vehicles 4, 6. In this embodiment, the joint state vector is defined as:

$$x_{k=0} = \begin{bmatrix} x^{V1} \\ x^{V2} \\ t \end{bmatrix}$$

where: $x^{Vi}$ is a state of the ith vehicle;
t is a universal time dimension that all vehicle states exist in; and
k is a discrete time-step of the Kalman filter of the processing module 22. In this embodiment, k=0 denotes the initial time-step of the Kalman filter.

In this embodiment, a state of a vehicle $x^{Vi}$ is defined to be:

$$x^{Vi} = \begin{bmatrix} x_i \\ y_i \\ \theta_i \end{bmatrix}$$

where: $x_i$ is an x-coordinate of the ith vehicle as measured from an origin which may, for example, be located at the ground station 2;
$y_i$ is a y-coordinate of the ith vehicle as measured from an origin which may, for example, be located at the ground station 2; and
$\theta_i$ is a heading of the ith vehicle as measured from a reference heading e.g. North.

In some embodiments, a state of a vehicle $X^{Vi}$ may include one or more other vehicle parameters (such as a z-position, an x-velocity, a y-velocity, a z-velocity, an altitude, a roll, a pitch, a yaw, a rotational velocity, a sensor bias) instead of or in addition to one or more of the above mentioned vehicle parameters.

In some embodiments, the time parameter t may be used to provide that the vehicle 4, 6 avoid dynamic obstacles.

In some embodiments, the time parameter t may be used (e.g. in time-varying localisation systems) to provide that positional measurements of vehicles are only taken at times when the localisation system tends to be sufficiently accurate.

Also, in embodiments in which a cost of a vehicle route is related to time, the time parameter t may be used to determine a cost of a vehicle route.

At step s28, the processing module 22 calculates a covariance of the state $x_k$. In this embodiment, the covariance of the state $x_k$ is defined as:

$$P_k = \begin{bmatrix} P_k^{V1} & 0 & 0 \\ 0 & P_k^{V2} & 0 \\ 0 & 0 & P_k^t \end{bmatrix}$$

where: $P_k^{Vi}$ is a covariance matrix of the ith vehicle;
$P_k^t$ is a covariance matrix of the time parameter t; and
0 is a matrix of zeros.

In this embodiment, a covariance matrix of the ith vehicle $P_k^{Vi}$ is defined as:

$$P^{Vi} = \begin{bmatrix} \sigma_{xi}^2 & 0 & 0 \\ 0 & \sigma_{yi}^2 & 0 \\ 0 & 0 & \sigma_{\theta i}^2 \end{bmatrix}$$

where: $\sigma_{xi}$ is a variance of the x-coordinate of the ith vehicle;
$\sigma_{yi}$ is a variance of the y-coordinate of the ith vehicle; and
$\sigma_{\theta i}$ is a variance of the heading of the ith vehicle.

At step s30, the processing module performs a Rapidly-exploring Random Belief Tree (RRBT) algorithm that is extended to compute multiple coordinated vehicle routes that provide multiple vehicle rendezvous. The RRBT algorithm used in this embodiment is briefly described later below with reference to FIG. 5. Further information on the RRBT algorithm and a use thereof may be found, for example, in "*Rapidly-exploring Random Belief Trees for*

*Motion Planning Under Uncertainty*", Bry, Adam, and Nicholas Roy, Proceedings of the 2011 IEEE International Conference on Robotics and Automation (ICRA 2011), May 9-13, 2011, which is incorporated herein by reference.

In this embodiment, the RRBT algorithm is performed to determine an initial route for each of the vehicles 4, 6 that, if followed by those vehicles, would provide that the second vehicle 6 is moved into the goal zone 12.

In some embodiments, an alternative to the RRBT algorithm may be used to determine the initial vehicle routes.

At step s32, the processing module 22 performs a "route shortening algorithm" on one or more of the vehicle routes determined at step s30.

In this embodiment, the route shortening algorithm is performed to "smooth" one or more of the initial vehicle routes so as to determine the first and second vehicle routes. This "smoothing" of an initial vehicle route tends to reduce the length of that initial route.

The route shortening algorithm is described in more detail later below with reference to FIG. 9.

In this embodiment, an output of the route shortening algorithm is the first and second routes that are to be sent from the processing module 22 to the vehicle control module 24.

Thus, the route determination process is provided.

Returning now to step s30 of the process of FIG. 4, FIG. 5 is a process flow chart showing certain steps of the RRBT algorithm performed by the processing module 22 to determine initial routes for the vehicles 4, 6. In this embodiment, this process is performed to determine the initial routes for the vehicles 4, 6 that, if followed by those vehicles 4, 6, would provide that the second vehicle 6 is moved into the goal zone 12.

In this embodiment, the process of FIG. 5 comprises constructing a graph (as understood in the field of graph theory). In this embodiment, the graph is a connected directed graph comprising a plurality of vertices connected together by edges. In other embodiments, a different appropriate type of structure is constructed, for example, a non-cyclic directed graph.

In this embodiment, the graph is constructed in a space X of all possible joint state vectors x.

At step s34, the graph that is to be constructed is initialised with a single vertex and a single belief. This single vertex and corresponding belief is a root node of the graph that is to be constructed.

In this embodiment, the single vertex that defines the root node of the graph is the estimate (or measurement) of the joint state of the vehicles 4, 6 produced at step s20, i.e. $x_0$.

In this embodiment, the belief that defines the root node of the graph specifies the uncertainty of the estimate of $x_0$, i.e. $P_0$. Also, in this embodiment, the belief that defines the root node of the graph specifies an initial path cost. Also, in this embodiment, the belief that defines the root node of the graph specifies a distribution of trajectories that are dependent on the controllability of the vehicles.

In this embodiment, the initial vertex $x_0$ is a point within the space X. The initial vertex $x_0$ specifies a position (i.e. an x- and y-coordinate), and a heading for each of the vehicles 4, 6.

At step s36, an index a is set to be equal to 1, i.e. a=1.

At step s38, the space X is randomly sampled so as to provide an $a^{th}$ vertex $x_a$.

In this embodiment, the $a^{th}$ vertex $x_a$ is a point within the space X. The $a^{th}$ vertex $x_a$ specifies a position (i.e. an x- and y-coordinate), and a heading for each of the vehicles 4, 6.

In this embodiment, the $a^{th}$ vertex $x_a$ is a different point in the space X to each previously sampled vertex and the initial vertex $x_0$.

At step s40, the $a^{th}$ vertex $x_a$ is connected to the nearest other vertex in the space X (or a plurality of nearest other vertices in the space X). This connection is a possible edge of the graph that is being constructed and so is hereinafter referred to as "the $a^{th}$ edge".

For example, in the first iteration of the process of FIG. 5, the first vertex $x_1$ is connected to the initial vertex $x_0$. The connection between the first vertex $x_1$ is connected to the initial vertex $x_0$ is hereinafter referred to as "the first edge".

In this embodiment, each of the different vertices within the space X specifies a different position and heading for each of the vehicles 4, 6. Thus, a connection or edge between two different vertices specifies a route for each of the vehicles 4, 6, from one location to a different location.

Figure 6:
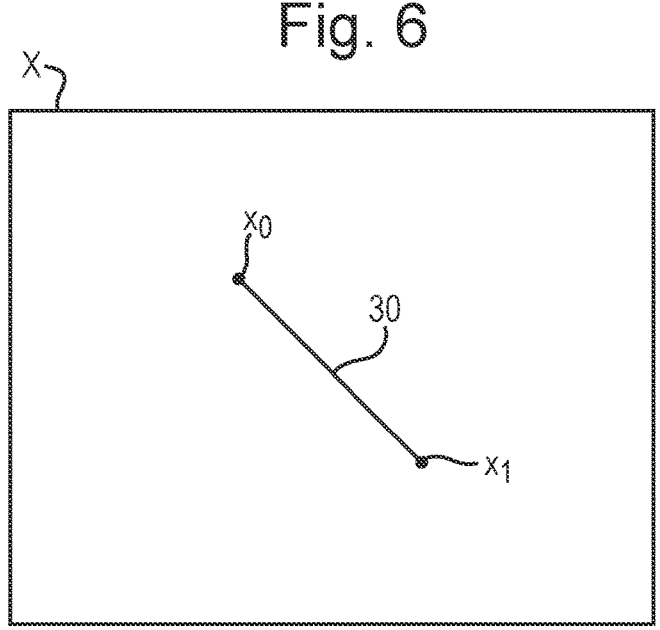
FIG. 6 is a schematic illustration (not to scale) showing a space of a joint state of the vehicles.

FIG. 6 is a schematic illustration (not to scale) showing a representation of the space X, the initial vertex $x_0$, the first vertex $x_1$, and the first edge 30 (between the initial vertex $x_0$ and the first vertex $x_1$).

Figure 7:
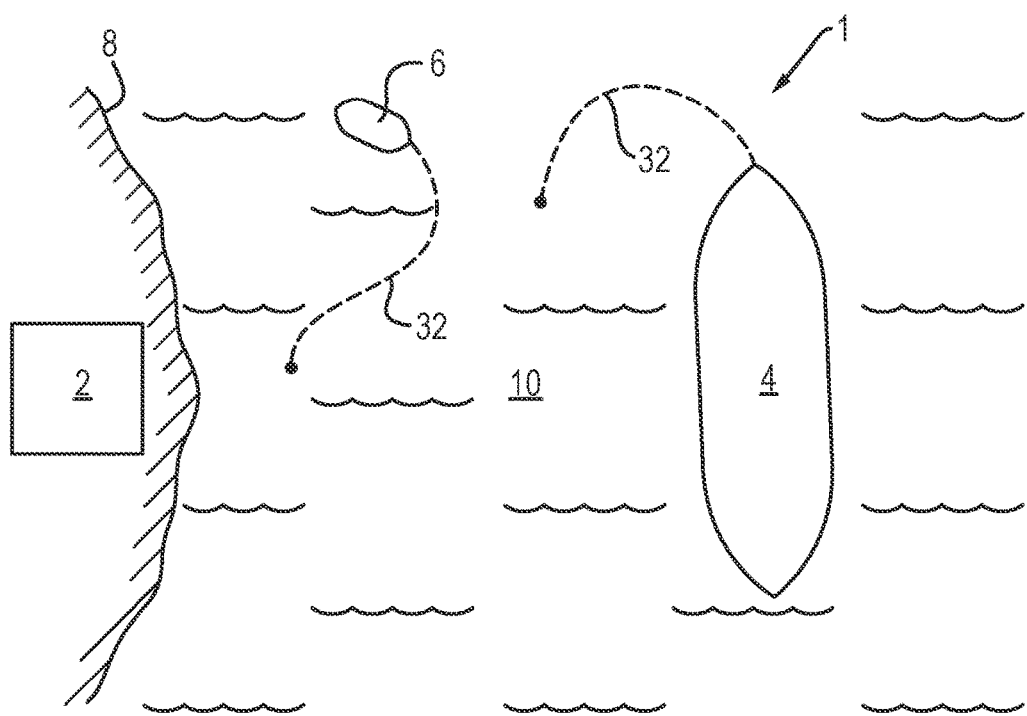
FIG. 7 is a schematic illustration (not to scale) showing vehicle routes within the scenario.

FIG. 7 is a schematic illustration (not to scale) showing the scenario 1, and vehicle routes 32 for the vehicles 4, 6 that are specified by the first edge 30.

At step s41, the processing module 22 determines, if the vehicles 4, 6 were to follow the routes specified by the $a^{th}$ edge, whether or not one or both of the vehicles 4, 6 would collide with an object (e.g. the land 8 or other object or terrain that the vehicles 4, 6 may not move through) or other vehicle.

For example, in the first iteration of the process of FIG. 5, the processing module 22 determines that the vehicles 4, 6 are able to follow the vehicle routes 32 defined by the first connection 30 as those routes 32 are routes across the body of water 10 that avoid objects the vehicles 4, 6 are unable to travel on, through or across.

In this embodiment, the process performed at step s38 comprises implementing the following state propagation equation to estimate a vehicle's motion along the vehicle routes:

$$x_k = Fx_{k-1} + B(u_{k-1} + w_k)$$

where: F=I defines a motion model for the vehicles 4, 6;
B=I defines a control model for the vehicles 4, 6;
u is a velocity vector;
w is a random process disturbance for the velocity vector u. In this embodiment, $W_k \sim N(0, \text{diag}(\sigma_x^2))$.

In this embodiment, motion and control are independent for each element of the state space.

In other embodiments, a different motion model may be used to estimate a vehicle's motion along the vehicle routes.

Any appropriate method may be used to determine whether or not, if the vehicles 4, 6 were to follow the routes specified by the $a^{th}$ edge, one or both of the vehicles 4, 6 would collide with an object or other vehicle. One example method of determining whether or not the two vehicles collide is as follows. An analogous method may be used to determine whether or not a vehicle collides with a non-vehicle object.

In this embodiment, each vehicle 4, 6 is represented by a respective polygon $Y^{vi}$. The ith polygon $Y^{vi}$ represents the ith vehicle as a dynamic obstacle.

The estimate of a state of the ith vehicle (i.e. the estimate of $x^{vi}$) is defined to be the barycentre of the ith polygon $Y^{vi}$.

In this embodiment, each polygon is defined to be a set of 2-dimensional vertices centred around the barycentre of that polygon, i.e.

$$Y^{Vi} = \begin{bmatrix} x_1 & y_1 \\ x_2 & y_2 \\ \vdots & \vdots \\ x_N & y_N \end{bmatrix}$$

Thus, an uncertain vehicle object state may be defined as a tuple, i.e. $\tau^{Vi} = (\hat{x}^{Vi}, P^{Vi} Y^{Vi})$, where $\hat{x}^{Vi}$ is the estimate of $x^{Vi}$.

In this embodiment, it is assumed that the uncertainty in position on any part of a polygon is the same as the uncertainty of the barycentre of that polygon, i.e. it is assumed that the uncertainty of a point on the polygon $Y^{Vi}$ is $P^{Vi}$.

In this embodiment, an outer edge of each polygon is sampled. Each sampled point on an outer edge of a polygon has an uncertainty in position equal to the uncertainty of the barycentre of that polygon.

In this embodiment, a distance between two adjacent sampled points along an edge of a polygon is defined as:

$$s_{dist} = n\sqrt{\max(\lambda_1, \lambda_2)}$$

where: $\lambda_1$ is the largest eigenvalue of the positional covariance matrix of the first vehicle 4;

$\lambda_2$ is the largest eigenvalue of the positional covariance matrix of the second vehicle 6; and n is a number of standard variations from a mean x.

In this embodiment, a collision between two polygons may be detected by determining the Mahalanobis distance between two covariance ellipses, each of which is centred around a sample point along an edge of a different polygon.

In this embodiment, the Mahalanobis distance between two sample points is:

$$d_{l,m}^{Vi,Vj} = (x_l^{Vi} - x_m^{Vj})^T (P^{Vi} + P^{Vj})^{-1} (x_l^{Vi} - x_m^{Vj})$$

where: $i = 1, \ldots, N' \in x$
$j = 1, \ldots, N' \in x$
$l = 1, \ldots, K \in \overline{Y}$
$m = 1, \ldots, K \in \overline{Y}$ N' is the number of vehicles;

K is the number of sample points around an edge of a polygon;

$\overline{Y}$ is a vector of sample points around an edge of a polygon; and $d_{l,m}^{Vi,Vj}$ is a statistical distance between the lth sample point on the polygon that represents the ith vehicle and the mth sample point on the polygon that represents the jth vehicle.

The Mahalanobis distance has a chi-squared distribution for Normally distributed random variables. Thus, in this embodiment a collision between the ith and jth polygons (i.e. a collision between the ith and jth vehicles) is detected if for any pair (l, m), $d_{l,m}^{Vi,Vj} < \chi_{p_\chi}^2$, where $p_\chi$ is a probability interval. Similarly, in this embodiment, no collision between the ith and jth polygons (i.e. no collision between the ith and jth vehicles) is detected if, for any pair (l, m), $d_{l,m}^{Vi,Vj} \geq \chi_{p_\chi}^2$.

In some embodiments, objects that are to be avoided by the vehicles may be modelled as polygons in a similar way to that described above for the vehicles 4, 6. Thus, collisions between an object and a vehicle may be detected.

In some embodiments, if, for example, there is significant uncertainty in a vehicle's orientation $\theta_i$, polygon samples may be taken for orientations within a range, e.g.

$$[\theta_i \pm \sigma_p \sqrt{P_\theta^{Vi}}]$$

where: $\sigma_p$ is a number of standard deviations from the mean x; and $P_\theta^{Vi}$ is the covariance of the heading uncertainty of the ith vehicle.

In this embodiment, the body of water 10 does not contain any objects that the vehicle 4, 6 may collide with. However, in other embodiments, such objects may be present in the body of water 10. Examples of such objects include, but are not limited to, rocks, islands, oil platforms, and other boats.

If at step s41 the processing module 22 determines that, if the vehicles 4, 6 were to follow the route specified by the $a^{th}$ edge, one or both of the vehicles 4, 6 would collide with an object, the method proceeds to steps s42.

However, if at step s38 the processing module 22 determines that, if the vehicles 4, 6 were to follow the route specified by the $a^{th}$ edge, one or both of the vehicles 4, 6 would not collide with an object, the method proceeds to step s43.

At step s42, the $a^{th}$ vertex $x_a$ and the $a^{th}$ edge are disregarded by the processing module 22. In this embodiment, the $a^{th}$ vertex $x_a$ and the $a^{th}$ edge are not included in the graph that is being constructed.

After step s42, the method proceeds back to step s38 whereat the space X is re-sampled so as to provide an new $a^{th}$ vertex $x_a$.

Returning now to the case where the processing module 22 determines that, if the vehicles 4, 6 were to follow the route specified by the $a^{th}$ edge, one or both of the vehicles 4, 6 would not collide with an object, at step s43, the $a^{th}$ vertex $x_a$ and the $a^{th}$ edge are included in the graph being constructed.

At step s44, after the $a^{th}$ vertex $x_a$ and the $a^{th}$ edge have been added to the graph being constructed, the belief associated with the root node (i.e. the belief associated with the initial vertex $x_0$) is propagated along every different path within the current graph, thereby producing a belief tree.

In particular, in this embodiment, the uncertainty associated with $x_0$ (i.e. $P_0$) is propagated throughout the current graph, from the initial vertex $x_0$ to every other vertex in the current graph, along every different path within the current graph. Similarly, the initial cost associated with $x_0$ is propagated throughout the current graph, from the initial vertex $x_0$ to every other vertex in the current graph, along every different path within the current graph.

Thus, after belief propagation, in this embodiment, each vertex has associated with it one or more beliefs.

In particular, in this embodiment, after belief propagation each vertex in the current graph has associated with it, for each path defined by the current graph that passes through that vertex, a belief. A belief corresponding to a vertex and a path within the graph specifies an uncertainty of that of that vertex (i.e. an uncertainty associated with the vehicle positions and headings if that path had been followed by the vehicles) and a cost of that path.

In this embodiment, the beliefs of the graph and the edges connecting those beliefs define a "belief tree". Each of the beliefs associated with the vertices of the current graph is a "belief node" of the belief tree.

The following information is useful in understanding how a belief (which in this embodiment comprises a positional uncertainty, control distribution and a path cost) is propagated through the graph. Further information on belief propagation may be found, for example, in the above mentioned "*Rapidly-exploring Random Belief Trees for Motion Planning Under Uncertainty*", which is incorporated herein by reference.

A "propagate function" that takes as its arguments an edge and a belief node at the starting vertex for that edge, and returns a belief node at the ending vertex for that edge, may be used.

An uncertainty of the positions and/or headings of the vehicles 4, 6 may be reduced, for example, by taking measurements of the vehicles 4, 6 by the radar system 20. Thus, an uncertainty corresponding to a vertex of the current tree may be reduced using radar measurements of the vehicles 4, 6.

Such measurements may be accounted for when propagating belief through the current tree. In this embodiment, a linear range-based model is used to determine a variance of the radar system 20. In this embodiment, the radar system 20 is located in the same space X as the vehicles 4, 6. A state of the radar system 20 $X^{radar}$ may, for example, specify a global position of the radar system 20, but not specify a heading.

In this embodiment, measurements taken by the radar system 20 of the joint state of the vehicles 4, 6 is defined to be:

$$Z_k = Hx_k + V_t$$

where: H is a linear measurement model; and $v_t$ is a measurement noise.

In this embodiment, H extracts, from the state space, the x- and y-coordinates of each of the vehicles 4, 6. In other words, H removes orientation and time from the state space. In this embodiment, the state space is defined as:

$$H = \begin{pmatrix} H^{V1} & 0 & \ldots & 0 & 0 \\ 0 & H^{V1} & \ldots & 0 & 0 \\ \vdots & \vdots & \ddots & \vdots & \vdots \\ 0 & 0 & \ldots & H^{VN} & 0 \end{pmatrix}$$

$$H^{Vi} = \begin{pmatrix} 1 & 0 & 0 \\ 0 & 1 & 0 \end{pmatrix},$$

$$i = 1, \ldots, N$$

In this embodiment, the measurement noise $v_t$ is distributed as follows:

$$v_t \sim N(0, \text{diag}(\sigma_z^2))$$

where: $\sigma_z$ is a noise variance of the measurement model.

In this embodiment:

$$\sigma_z = \begin{pmatrix} \sigma_z^{V1} \\ \sigma_z^{V2} \\ \vdots \\ \sigma_z^{VN} \end{pmatrix}$$

where: $\sigma_z^{Vi}$ is a measurement variance of the ith vehicle.

In this embodiment:

$$\sigma_z^{Vi} = \begin{pmatrix} r_s \| x^{radar} - x^{Vi} \| \\ r_s \| x^{radar} - x^{Vi} \| \end{pmatrix}$$

where: $r_s$ is a scaling factor that may be adjusted depending upon certain conditions, e.g., environmental conditions of the scenario 1 or operating parameters of the radar system 20.

In this embodiment, the accuracy of the radar system 20 decreases isotropically as the distance from the radar system 20 increases linearly.

In this embodiment, an obstacle may block a radar signal from the radar system 20 from being incident upon one of the vehicles 4, 6. For example, the first vehicle may at least partially block a radar signal from the radar system 20 from being incident upon the second vehicle 6. In other words, the first vehicle may, in effect, shelter the second vehicle 6 from a radar signal transmitted by the radar system 20.

In this embodiment, advantageously, this radar signal blocking is accounted for. This may be achieved as follows.

Firstly, for each vehicle 4, 6, a line from the radar system 20 to that vehicle 4, 6 is specified.

Secondly, each specified line is analysed to see whether or not that line intersects with an obstacle, e.g. an object or another vehicle. This may, for example, by performed using a line-line intersection algorithm to check whether the specified line interests with a polygon Y that represents an obstacle.

In this embodiment, a line between the radar system and a vehicle 4, 6 being intersected by an obstacle indicates that radar signals from the radar system to that vehicle 4, 6 are blocked by that obstacle.

Thirdly, for each vehicle 4, 6 to which radar signals from the radar system are blocked, the measurement covariance for that vehicle $\sigma_z^{Vi}$ is set to be an arbitrarily large number, e.g.

$$\sigma_z^{Vi} = \begin{pmatrix} 10^9 \\ 10^9 \end{pmatrix}$$

Thus, a positional uncertainty may be propagated through the tree.

The following information is useful in understanding how a cost is propagated through the tree.

A cost or cost function may be representative of a travel time for the vehicles 4, 6, a distance traveled by the vehicles 4, 6, an amount of fuel used by the vehicles, any other appropriate type of cost or cost function or combination thereof. A cost function may be propagated from a first vertex of the current tree to a second vertex of the current tree, along an edge in the current tree, by taking the cost function of the first vertex, modifying that cost function to include the times, distance, amount of fuel etc. that is used by the vehicle travelling along routes specified by the edge between the first vertex and the second vertex, and setting a cost function of the second vertex to be equal to the modified cost function.

At step s46, it is determined whether or not one or more "ending criteria" are satisfied. In this embodiment, an ending criterion may be any appropriate criterion, for example, a criterion that the index a is equal to a predetermined threshold value B. Also for example, an ending criterion may be that a computing time has exceeded a threshold time T. Also for example, an ending criterion may be that the number of sampled states that correspond to the second vehicle 6 being wholly within the goal zone 12 exceeds a predetermined threshold value M.

If, at step s46 it is determined that the one or more ending criteria are not satisfied, the method proceeds to step s48.

However, if at step s46 it is determined that each of the one or more ending criteria are satisfied, the method proceeds to step s50.

At step s48, the index a is increased by 1, i.e. a=a+1.

After step s48, in this embodiment, the method proceeds back to step s38 whereat the space X is randomly sampled so as to provide new sample.

Returning now to the case where each of the one or more ending criteria are satisfied, at step s50 the tree that has been constructed, hereinafter referred to as the "final graph" is provided.

Figure 8:
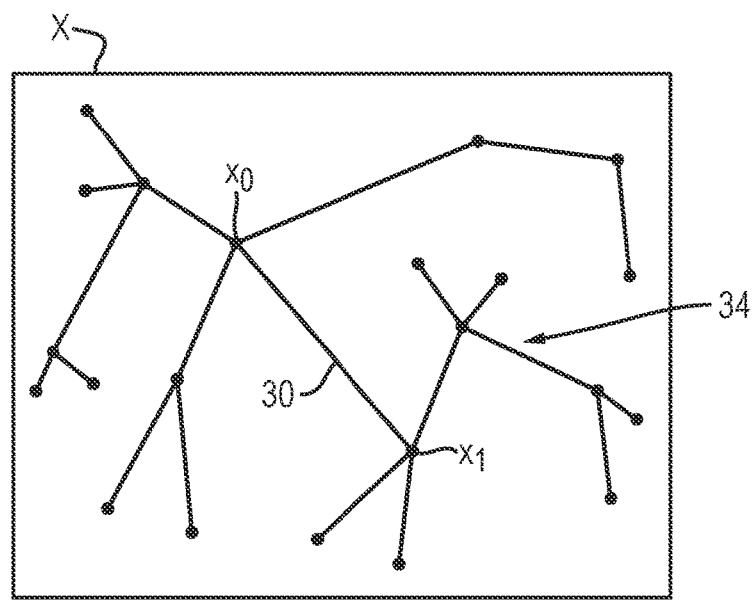
FIG. 8 is a schematic illustration (not to scale) showing a constructed tree.

FIG. 8 is a schematic illustration (not to scale) showing the final graph 34 that has been constructed at step s50. The final graph 34 comprises a plurality of sampled vertices (indicated by solid black circles in FIG. 8) connected together by edges (indicated by lines connecting the vertices).

In this embodiment, each vertex in the final graph 34 corresponds to a state x in the space X (i.e. a position and heading for each of the vehicles 4, 6).

In this embodiment, each edge in the final graph 34 corresponds to a route for the vehicles 4, 6 across the body of water 10 (between positions corresponding to those represented by the vertices that that edge connects).

Thus, a path through the final graph 34, from a starting vertex to an ending vertex, along a series of edges of the final graph 34, defines a route for the vehicles 4, 6 across the body of water 10 (between positions corresponding to those represented by the starting vertex and the ending vertex).

Also in this embodiment, each vertex in the final graph 34 has associated with it one or more beliefs (or uncertainties). In this embodiment each belief associated with a vertex corresponds to a respective path within the final graph 34 that passes through that vertex.

For each vertex and each path within the final graph 34 that passes through that vertex, the associated belief specifies an uncertainty for that vertex and that path (i.e. an uncertainty of the vehicle positions and headings if a route specified by that path were to be followed by those vehicles). Also, for each vertex and each path within the final graph 34 that passes through that vertex, the associated belief specifies a cost for that vertex and that path (i.e. a cost that it would take to for the vehicles to travel along a route specified by that path).

At step s52, the one or more vertices in the final graph 34 that correspond to a state in which the second vehicle 6 is wholly located within the goal zone 12 is identified.

In this embodiment, the second vehicle 6 is wholly located within the goal zone 12 if the polygon that represents the second vehicle $Y^{V2}$ is located wholly within the goal zone 12 and there is no collision between the polygon that represents the second vehicle $Y^{V2}$ and a boundary of the goal zone 12. Determining whether or not there is a collision between the polygon that represents the second vehicle $Y^{V2}$ and the boundary of the goal zone 12 may, for example, be determined using a method analogous to that described above for determining whether or not a vehicle 4, 6 collides with an object.

At step s54, from the set of vertices identified at step s52, the vertex that is associated with a belief that specifies a lowest cost value is identified. The belief associated with the lowest cost is also identified.

The vertex identified at step s54 is hereinafter referred to as the "final vertex".

The belief identified at step s54 corresponds to the final vertex and also a specific path within the tree 34 from the initial vertex $x_0$ to the final vertex.

At step s56, the specific path within the final graph 34 from the initial vertex $x_0$ to the final vertex that corresponds to the belief identified at step s54 is identified.

At step s58, the routes for the vehicles 4, 6 across the body of water that is specified by the path within the final graph 34 that has been identified at step s56 are determined.

The determined routes for the vehicles 4, 6 are the initial routes for the vehicles 4, 6, that, if followed by those vehicles 4, 6, would provide that the second vehicle 6 is moved into the goal zone 12.

Thus, the RRBT process is provided.

Returning now to step s32 of the process of FIG. 4, FIG. 9 is a process flow chart showing certain steps of the route shortening algorithm performed by the processing module 22 to reduce the length of initial vehicle routes. In this embodiment the process of FIG. 9 is performed by the processing module 22.

At step s60, the path within the final graph 34 that corresponds to the initial routes for the vehicles 4, 6 (i.e. the path identified at step s56 of the process of FIG. 5) is identified.

At step s62, a previously unselected vertex along the identified path is selected. In a first iteration of the process of FIG. 9, all vertices along the identified path are previously unselected vertices.

The vertex that is selected is denoted as $x_p$. In this embodiment, the selected vertex $x_p$ is connected by an edge to the next vertex along the identified path, i.e. $x_p$ is connected by an edge to the vertex $x_{p+1}$.

At step s64, the vertex $x_{p+2}$ is selected.

At step s66, the selected vertices are connected by an edge. In other words, the vertex $x_p$ and the vertex $x_{p+2}$ are connected by an edge. The edge connecting the vertex $x_p$ and the vertex $x_{p+2}$ is hereinafter referred to as the "new edge".

Figure 10:
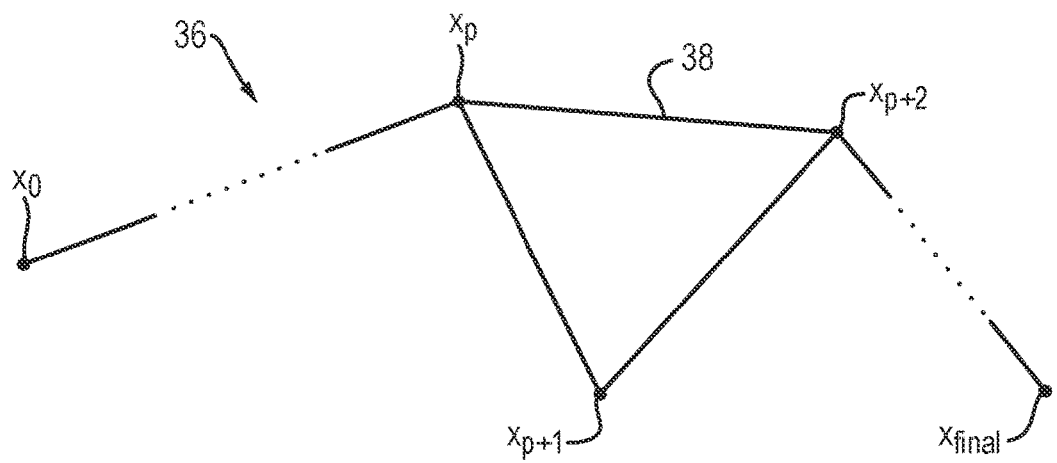
FIG. 10 is a schematic illustration showing a portion of a path with the tree.

FIG. 10 is a schematic illustration showing a portion of the path identified at step s60 (which is indicated in FIG. 10 by the reference numeral 36), the vertex $x_p$, the vertex $x_{p+2}$, and the new edge 38.

In this embodiment, the path 36 is a path from the initial vertex $x_0$ to a final vertex $x_{final}$. The final vertex $x_{final}$ corresponds to a state wherein the second vehicle 6 is located wholly with the goal zone 12. As shown in FIG. 10, the new edge 38 provides a path from the initial vertex $x_0$ to the final vertex $x_{final}$ that bypasses the vertex $x_{p+1}$, i.e. a path that passes through the following vertices in order: $x_0, \ldots, x_p, x_{p+2}, \ldots, x_{final}$.

At step s68, it is determined whether or not, if the vehicles 4, 6 were to follow the routes specified by the new edge 38, one or both of the vehicles 4, 6 would collide with an object (e.g. the land 8 or other object or terrain that the vehicles 4, 6 may not move through) or other vehicle. In this embodiment, this collision determination process is performed in the same way as described above at step s41 of the process of FIG. 5.

If at step s68 it is determined that, if the vehicles 4, 6 were to follow the route specified by the new edge 38, one or both of the vehicles 4, 6 would collide with an object, the method proceeds to steps s74. Step s74 will be described in more detail later below after a description of steps s70 and s72.

However, if at step s68 it is determined that, if the vehicles 4, 6 were to follow the route specified by the new edge 38, one or both of the vehicles 4, 6 would not collide with an object, the method proceeds to step s70.

At step s70, the belief associated with the root node (i.e. the belief associated with the initial vertex $x_0$) is propagated throughout the path from the initial vertex $x_0$ to the final vertex $x_{final}$ that by-passes the vertex $x_{p+1}$ (i.e. the path from the initial vertex $x_0$ to the final vertex $x_{final}$ provided by new edge 38). In this embodiment, this belief propagation process is performed in the same way as described above at step s44 of the process of FIG. 5.

At step s72, it is determined whether or not the path from the initial vertex $x_0$ to the final vertex $x_{final}$ that by-passes the vertex $x_{p+1}$ (i.e. the path from the initial vertex $x_0$ to the final vertex $x_{final}$ provided by new edge 38) is a lower cost path than the path from the initial vertex $x_0$ to the final vertex $x_{final}$ that includes the vertex $x_{p+1}$. This may for example be performed by comparing the costs associated with the two different paths.

If at step s72 it is determined that the path from the initial vertex $x_0$ to the final vertex $x_{final}$ that by-passes the vertex $x_{p+1}$ is not a lower cost path than the path from the initial vertex $x_0$ to the final vertex $x_{final}$ that includes the vertex $x_{p+1}$, the method proceeds to steps s74.

However, if at step s72 it is determined that the path from the initial vertex $x_0$ to the final vertex $x_{final}$ that by-passes the vertex $x_{p+1}$ is a lower cost path than the path from the initial vertex $x_0$ to the final vertex $x_{final}$ that includes the vertex $x_{p+1}$, the method proceeds to steps s76.

At step s74, the new edge 38 is disregarded. After step s74, the method proceeds to step s78 which will be described in more detail later below after a description of step s76.

At step s76, the new edge 38 is included in the path 36. Also, in this embodiment, the vertex $x_{p+1}$ is removed from the path 36. Also, in this embodiment, the edges in the path 36 that are connected to the vertex $x_{p+1}$ are removed from the path 36. In other words, the edge connecting $x_p$ to $x_{p+1}$ and the edge connecting $x_{p+1}$ to $x_{p+2}$ are removed from the path 36. Thus, the path 36 is updated.

At step s78, it is determined whether or not all vertices in the current path have previously been selected.

If, at step s78, it is determined that all vertices in the current path have not yet been selected, the method proceeds back to step s62 whereat a new previously unselected vertex along the current path is selected.

However, if at step s78 it is determined that all vertices in the current path have been previously selected, the method proceeds to step s80.

At step s80, the routes for the vehicles 4, 6 across the body of water 10 that are specified by the current updated path are determined.

The determined routes for the vehicles 4, 6 are the first and second routes that are to be sent by the processing unit 22 for use by the vehicle control module 24 at step s12.

Thus, the route shortening algorithm is provided.

Advantageously, a method by which a plurality of autonomous vehicles may be controlled is provided. The above described system and method tends to provide for coordinated vehicle control. The above described system and method tends to enable vehicles to be controlled so as to cause the vehicles to "rendezvous", i.e. to control the vehicles such that one vehicle is located within a region that has a fixed location relative to another vehicle. This tends to be in contrast to conventional methods of controlling autonomous vehicles which typically control a single vehicle such that that vehicle is moved to a location that has a fixed global position.

Thus, the above described method and apparatus advantageously tends to allow for coordinated vehicle rendezvous.

Advantageously, the above described system and method may be extended to control more than two vehicles.

Advantageously, using the above described system and method to control vehicles, collisions between those vehicles and collisions between a vehicle and a non-vehicle object tend to be avoided. The above described method includes modelling a vehicle footprint as a 2-dimensional polygon, and incorporating location uncertainty contained within belief states calculated by the processing module, so as to determine vehicle routes that ensure that vehicles do not collide with other vehicles or non-vehicle objects.

Advantageously, the above described method and system may be used to determine routes for vehicles that minimise a cost (e.g. a time-cost, distance-cost, fuel-cost, or any other cost function).

Advantageously, the above described method includes using measurements of the vehicle locations (taken by the radar system) to reduce uncertainty about the vehicle locations. Vehicle routes determined using the above described system and methods advantageously tend to pass through regions in which positional measurements of the vehicles may be made so as to reduce an uncertainty associated with the positions of the vehicles.

Advantageously, the above described system and method tends to account for positional measurements of a vehicle being blocked, e.g. by other vehicles or non-vehicle objects.

Advantageously, implementing the above described route shortening algorithm tends to modify an initial route so as to reduce a distance-cost, time-cost, fuel-cost, or other cost of that initial route. In the above embodiments, the initial routes are determined by implementing the RRBT algorithm. In some embodiments, the route shortening algorithm may be iterated multiple times so as to further modify an initial route so as to further reduce a cost of the route.

Advantageously, implementing the above described route shortening algorithm tends to be computationally efficient. Thus, the route shortening algorithm tends facilitate real-time route planning and vehicle control.

Advantageously, the above described system and methods tend to account for the different dynamics of each vehicle. For example, a large ship tends to be able to change direction relatively slowly, whereas a smaller boat tends to be capable of changing direction relatively quickly.

Advantageously, the above described system and methods tend usable with vehicles that follow a pre-defined path. Apparatus, including the processing module, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 3, 4, 5 and 9 and described above may be omitted or such process steps may be performed in differing order to that presented above and shown in those Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the method of controlling a group of vehicles is implemented in the scenario described above with reference to FIG. 1. However, in other embodiments the method is implemented in a different scenario.

In the above embodiments, routes for two vehicles are calculated and those two vehicles are controlled. However, in other embodiments routes for a different number of vehicles (e.g. more than two vehicles) are determined. Those vehicles may then be controlled such that the routes determined for those vehicles are followed.

In the above embodiments, the method of controlling a group of vehicles is implemented to move the vehicles such that the second vehicle is wholly located within the goal zone that has a fixed location with respect to the first vehicle. The second vehicle being wholly located within the goal zone may be thought of as a "goal state" of the system. However, in other embodiments there is a different goal state. For example, in other embodiments, the goal state is a state wherein the second vehicle is wholly located within a first goal zone that has a fixed location with respect to the first vehicle, and also the first vehicle is wholly located within a second goal zone that has a fixed location with respect to the second vehicle. In other embodiments, there may be multiple goal zones defined with respect to multiple different vehicles. In some embodiments, a goal state may be a state wherein any appropriate number of vehicles are partially or wholly located within a goal zone at the same time, or at different times.

In the above embodiments, the vehicles are unmanned water-based (e.g. maritime) vehicles. However, in other embodiments one or more of the vehicles is a different type of vehicle, for example, a manned water-based vehicle, a manned or unmanned land-based vehicle, or a manned or unmanned aircraft. In some embodiments, one or more of the vehicles may be a different type of entity, for example, a non-vehicle, for example a robotic arm or winch.

In the above embodiments, measurements of the headings and positions of vehicles are taken by the radar system. However, in other embodiments one or more different types of measurements of the vehicles may be used instead of or in addition to the radar measurements. For example, in some embodiments a GPS measurement of a vehicle's position may be used. Other examples of appropriate sensors that may be used to take measurements of vehicles include, but are not limited to, a visible light camera, an infra-red camera, a LIDAR system, radio beacons, an inertial measurement unit, a compass, a marine speedometer, and an ultra-sonic sensor.

In some embodiments, measurements of the vehicles may be taken from multiple different locations. For example, in some embodiments, a plurality of different radar systems may take measurements of the headings and positions of vehicles. In some embodiments, a measurement may be taken using a vehicle-mounted system.

In the above embodiments, the scenario comprises a single ground station. However, in other embodiments multiple ground stations are used.

In the above embodiments, the determination of the vehicle routes is performed at the ground station. However, in other embodiments the determination of the vehicle routes is performed at one or more different locations instead of or in addition the ground station. For example, in some embodiments, determination of the vehicle routes may be performed onboard one or more of the vehicles. In some embodiments, the process of determining the vehicle routes may be distributed across a number of different processing systems located at different locations.

In the above embodiments, the method of controlling the vehicles comprises implementing the above described route shortening algorithm. However, in other embodiments, the route shortening algorithm is omitted.

The invention claimed is:

1. A method of determining routes for at least two vehicles, the method comprising:
   receiving, by a radar system, a first radar signal reflected from a first autonomous vehicle;
   receiving, by the radar system, a second radar signal reflected from a second autonomous vehicle;
   measuring, by the radar system, a position of the first autonomous vehicle using the first radar signal;
   measuring, by the radar system, a position of the second autonomous vehicle using the second radar signal;
   providing, for use by one or more processors, a specification of a region, the region having a fixed position in relation to the first autonomous vehicle;
   using the position of the first autonomous vehicle and the position of the second autonomous vehicle and the specification of the region, performing, by the one or more processors, a route determination process to determine a first route for the first autonomous vehicle and a second route for the second autonomous vehicle, wherein performing the route determination process includes:
      constructing a graph within a joint state space of the vehicles, the graph comprising a plurality of vertices and one or more edges connecting those vertices;
      identifying, within the constructed graph, a path from a first vertex of the graph to a second vertex of the graph, the first vertex corresponding to the measured positions of the vehicles, and the second vertex corresponding to the second vehicle being at least partially located within the region; and
   using the identified path, determining routes for the vehicles, thereby providing the first and second routes.

2. The method according to claim 1, wherein the method further comprises controlling, by a vehicle controller operatively coupled to the one or more processors, the vehicles such that the first autonomous vehicle follows the first route and the second autonomous vehicle follows the second route, thereby providing that the second autonomous vehicle is at least partially located within the region.

3. The method according to claim 1, wherein the graph is a rapidly-exploring random belief tree.

4. The method according to claim 1, wherein constructing the graph comprises:
   initialising the graph by determining, using the measured positions of the vehicles, the first vertex of the graph; and
   one or more times performing steps (i) to (iii), thereby providing the graph; wherein
   step (i) comprises sampling the joint state space of the vehicles to provide a further vertex;
   step (ii) comprises providing an edge connecting the further vertex to a different vertex of the graph; and
   step (iii) comprises including the further vertex and the edges in the graph.

5. The method according to claim 4, wherein, for each performance of steps (i) to (iii), an edge is only included in the graph, were the first and second autonomous vehicles to follow vehicle routes defined by that edge, if each vehicle would not collide with another vehicle or object.

6. The method according to claim 1, wherein identifying the path from the first vertex to the second vertex comprises:
assigning, to one or more vertices within the graph, one or more belief values;
propagating, along each path in the graph, the belief values so as assign to each vertex in the graph one or more belief values, each belief value associated to a vertex in the graph corresponding to a unique path in the graph that passes through that vertex; and
selecting, based upon one or more of the belief values, a path from the first vertex to the second vertex.

7. The method according to claim 6, wherein:
a belief value assigned to the first vertex is indicative of an uncertainty associated with the measurements of the positions of the vehicles; and
for each vertex in the graph other than the first vertex, a belief value assigned to that vertex is indicative of a positional uncertainty of the vehicles if the vehicles were to follow a route specified by a path in the graph from the first vertex to that vertex; and
propagating the belief values comprises adjusting one or more belief values to account for further measurements of a position of one or both of the vehicles taken by the measurement apparatus.

8. The method according to claim 6, wherein:
for each vertex in the graph other than the first vertex, a belief value assigned to that vertex represents a cost value associated with the vehicles following a route specified by a path in the graph from the first vertex to that vertex; and
identifying the path from the first vertex to the second vertex comprises:
identifying, from a set of belief values assigned to the second vertex, the belief value corresponding to the lowest cost value; and
identifying the path from the first vertex to the second vertex corresponding to the identified belief value.

9. The method according to claim 7, wherein:
for each vertex in the graph other than the first vertex, a belief value assigned to that vertex represents a cost value associated with the vehicles following a route specified by a path in the graph from the first vertex to that vertex;
identifying the path from the first vertex to the second vertex comprises:
identifying, from a set of belief values assigned to the second vertex, the belief value corresponding to the lowest cost value; and
identifying the path from the first vertex to the second vertex corresponding to the identified belief value.

10. The method according to claim 1, wherein determining routes for the vehicles comprises:
performing a path shortening algorithm on the identified path so as to provide a shortened path; and
determining routes for the vehicles specified by the shortened path, thereby providing the first and second routes;
wherein the path shortening algorithm comprises:
selecting a vertex along the identified path so as to provide a first path vertex;
selecting a further vertex along the identified path so as to provide a second path vertex, the second path vertex being connected to the first path vertex by at least two edges;
determining a first cost value, the first cost value representing a cost associated with a path within the identified path from the first path vertex to the second path vertex;
providing an additional edge, the additional edge having as its starting vertex the first path vertex and as its ending vertex the second path vertex;
determining a second cost value, the second cost value representing a cost associated with a path from the first path vertex to the second path vertex along the additional edge; and
depending on the first and second cost values, either:
disregarding the additional edge and maintaining the identified path; or
modifying the identified path by removing, from the identified path, the edges and vertices in the identified path by which the first path vertex and the second path vertex are connected, and including, in the identified path, the additional edge.

11. The method according to claim 1, wherein one or more of the vehicles is an unmanned vehicle.

12. The method according to claim 1, wherein the measurement apparatus comprises one or more measurement systems selected from the group: a radar system, and a global positioning system.

13. The method according to claim 1, wherein the route determination process comprises performing a Rapidly-exploring Random Belief Tree algorithm to determine the first route for the first autonomous vehicle and the second route for the second autonomous vehicle.

14. Apparatus for determining routes for at least two vehicles, the apparatus comprising:
a radar system configured to measure a position of a first autonomous vehicle and a position of a second autonomous vehicle using:
a first radar signal reflected from a first autonomous vehicle, and
a second radar signal reflected from a second autonomous vehicle, respectively; and
one or more processors coupled to the measurement apparatus and configured, using the position of the first autonomous vehicle and the position of the second autonomous vehicle and using a specification of a region having a fixed position in relation to the first autonomous vehicle, to perform a route determination process to determine a first route for the first autonomous vehicle and a second route for the second autonomous vehicle; wherein the route determination process comprises:
constructing a graph within a joint state space of the vehicles, the graph comprising a plurality of vertices and one or more edges connecting those vertices;
identifying, within the constructed graph, a path from a first vertex of the graph to a second vertex of the graph, the first vertex corresponding to the measured positions of the vehicles, and the second vertex corresponding to the second autonomous vehicle being at least partially located within the region; and
determining routes for the vehicles specified by the identified path, thereby providing the first and second routes.

15. One or more non-transitory machine readable mediums encoded with instructions that when executed by one or more processors cause a process to be carried out for determining routes for at least two vehicles, the process comprising:

receiving, from a radar system, a position of a first autonomous vehicle based on a first radar signal received at the radar system reflected from the first autonomous vehicle;

receiving, from the radar system, a position of a second autonomous vehicle based on a second radar signal received at the radar system reflected from the second autonomous vehicle;

receiving a specification of a region, the region having a fixed position in relation to the first autonomous vehicle;

using the position of the first autonomous vehicle, the position of the second autonomous vehicle, and the specification of the region, performing a route determination routine to determine a first route for the first autonomous vehicle and a second route for the second autonomous vehicle, wherein performing the route determination routine includes:

constructing a graph within a joint state space of the vehicles, the graph comprising a plurality of vertices and one or more edges connecting those vertices;

identifying, within the constructed graph, a path from a first vertex of the graph to a second vertex of the graph, the first vertex corresponding to the measured positions of the vehicles, and the second vertex corresponding to the second autonomous vehicle being at least partially located within the region; and using the identified path, determining routes for the vehicles, thereby providing the first and second routes.

16. The one or more non-transitory machine readable mediums according to claim 15, wherein the process for determining routes for the at least two vehicles further comprises controlling, by a vehicle controller configured to operatively couple to the one or more processors, the vehicles such that the first autonomous vehicle follows the first route and the second autonomous vehicle follows the second route, thereby providing that the second autonomous vehicle is at least partially located within the region.

17. The one or more non-transitory machine readable mediums according to claim 15, wherein constructing the graph comprises:

initialising the graph by determining, using the measured positions of the vehicles, the first vertex of the graph; and one or more times performing steps (i) to (iii), thereby providing the graph, wherein:

step (i) comprises sampling the joint state space of the vehicles to provide a further vertex;

step (ii) comprises providing an edge connecting the further vertex to a different vertex of the graph; and step (iii) comprises including the further vertex and the edges in the graph;

wherein, for each performance of steps (i) to (iii), an edge is only included in the graph, were the first and second autonomous vehicles to follow vehicle routes defined by that edge, if each vehicle would not collide with another vehicle or object.

18. The one or more non-transitory machine readable mediums according to claim 15, wherein identifying the path from the first vertex to the second vertex comprises:

assigning, to one or more vertices within the graph, one or more belief values;

propagating, along each path in the graph, the belief values so as assign to each vertex in the graph one or more belief values, each belief value associated to a vertex in the graph corresponding to a unique path in the graph that passes through that vertex; and selecting, based upon one or more of the belief values, a path from the first vertex to the second vertex.

19. The one or more non-transitory machine readable mediums according to claim 18, wherein:

a belief value assigned to the first vertex is indicative of an uncertainty associated with the positions of the vehicles; and for each vertex in the graph other than the first vertex, a belief value assigned to that vertex is indicative of a positional uncertainty of the vehicles if the vehicles were to follow a route specified by a path in the graph from the first vertex to that vertex; and propagating the belief values comprises adjusting one or more belief values to account for further measurements of a position of one or both of the vehicles taken by the radar system.

20. The one or more non-transitory machine readable mediums according to claim 15, wherein determining routes for the vehicles comprises:

performing a path shortening algorithm on the identified path so as to provide a shortened path; and determining routes for the vehicles specified by the shortened path, thereby providing the first and second routes;

wherein the path shortening algorithm comprises:

selecting a vertex along the identified path so as to provide a first path vertex;

selecting a further vertex along the identified path so as to provide a second path vertex, the second path vertex being connected to the first path vertex by at least two edges;

determining a first cost value, the first cost value representing a cost associated with a path within the identified path from the first path vertex to the second path vertex;

providing an additional edge, the additional edge having as its starting vertex the first path vertex and as its ending vertex the second path vertex;

determining a second cost value, the second cost value representing a cost associated with a path from the first path vertex to the second path vertex along the additional edge; and depending on the first and second cost values, either:

disregarding the additional edge and maintaining the identified path; or modifying the identified path by removing, from the identified path, the edges and vertices in the identified path by which the first path vertex and the second path vertex are connected, and including, in the identified path, the additional edge.

* * * * *